(12) United States Patent
Hong et al.

(10) Patent No.: US 9,664,940 B2
(45) Date of Patent: May 30, 2017

(54) DISPLAY PANEL COMPRISING A COLOR FILTER HAVING A DEPRESSION THAT IS PLANARIZED BY A BLACK MATRIX DEPOSITED WITHIN THE DEPRESSION

(71) Applicant: Samsung Display Co., Ltd., Yongin, Gyeonggi-Do (KR)

(72) Inventors: Kipyo Hong, Suwon-si (KR); Jae Hwa Park, Gumi-si (KR); Sang-Myoung Lee, Seoul (KR); Hyunggi Jung, Cheonan-si (KR); Sunghwan Won, Suwon-si (KR)

(73) Assignee: Samsung Display Co., Ltd. (KR)

( * ) Notice: Subject to any disclaimer, the term of this patent is extended or adjusted under 35 U.S.C. 154(b) by 177 days.

(21) Appl. No.: 14/158,472

(22) Filed: Jan. 17, 2014

(65) Prior Publication Data

US 2015/0049273 A1    Feb. 19, 2015

(30) Foreign Application Priority Data

Aug. 14, 2013  (KR) .................. 10-2013-0096693

(51) Int. Cl.
*G02F 1/1337*  (2006.01)
*G02F 1/1362*  (2006.01)
*G02F 1/1335*  (2006.01)
*G02F 1/1333*  (2006.01)

(52) U.S. Cl.
CPC .. *G02F 1/133512* (2013.01); *G02F 1/133377* (2013.01); *G02F 1/133723* (2013.01); *G02F 1/136209* (2013.01); *G02F 2001/136222* (2013.01)

(58) Field of Classification Search
CPC .............. G02F 2001/136222; G02F 1/136209
See application file for complete search history.

(56) References Cited

U.S. PATENT DOCUMENTS

| 6,392,728 | B2 | 5/2002 | Tanaka et al. | |
|---|---|---|---|---|
| 2006/0146267 | A1* | 7/2006 | Choi | G02F 1/133377 349/156 |
| 2011/0049519 | A1 | 3/2011 | Kim et al. | |
| 2012/0062448 | A1* | 3/2012 | Kim | G02F 1/133377 345/55 |
| 2012/0206675 | A1* | 8/2012 | Seo | H01L 27/3211 349/96 |
| 2014/0009709 | A1* | 1/2014 | Lim | G02F 1/136286 349/43 |

FOREIGN PATENT DOCUMENTS

| JP | 2008-026857 | 2/2008 |
|---|---|---|
| JP | 2008-281919 | 11/2008 |

(Continued)

*Primary Examiner* — Paul Lee
(74) *Attorney, Agent, or Firm* — Innovation Counsel LLP (57) ABSTRACT

A display panel includes a base substrate, a driving circuit, and a roof layer defining a cavity. A color filter is disposed on the base substrate to at least partially cover the driving circuit. The color filter is disposed at least on a pixel area and includes a depression positioned at least partially within a circuit area. A black matrix is disposed upon the depression of the color filter. The black matrix being upon the depression allows an inlet portion of the cavity to remain greater than a certain cross-sectional area.

10 Claims, 9 Drawing Sheets

(56) References Cited

FOREIGN PATENT DOCUMENTS

| KR | 1020050068884 A | 7/2005 |
|----|-----------------|--------|
| KR | 1020070006485 A | 1/2007 |
| KR | 1020070048412 A | 5/2007 |
| KR | 1020080113596 A | 12/2008 |
| KR | 1020090070287 A | 7/2009 |
| KR | 1020130129008 A | 11/2013 |

* cited by examiner

DISPLAY PANEL COMPRISING A COLOR FILTER HAVING A DEPRESSION THAT IS PLANARIZED BY A BLACK MATRIX DEPOSITED WITHIN THE DEPRESSION

CROSS-REFERENCE TO RELATED APPLICATION

This U.S. non-provisional patent application claims priority under 35 U.S.C. §119 to Korean Patent Application No. 10-2013-0096693, filed on Aug. 14, 2013, the contents of which are hereby incorporated by reference.

BACKGROUND

1. Field of Disclosure

The present disclosure relates generally to a display panel and a method of manufacturing the same. More particularly, the present disclosure relates to a display panel having reduced defects, and a method of manufacturing the display panel.

2. Description of the Related Art

A slim type display device typically includes two display substrates facing each other and an image display layer interposed between the two display substrates, e.g., a liquid crystal layer, an electrophoretic layer, etc.

The two display substrates are attached to each other while interposing a sealant therebetween. The two display substrates are spaced apart from each other at a uniform distance. Manufacture of such slim type display devices is complicated, and the corresponding manufacturing cost is thus high. Accordingly, in recent years, a display device employing only one display substrate has been pursued.

SUMMARY

The present disclosure provides a display panel including an alignment layer with reduced defects.

The present disclosure also provides a method of manufacturing the display panel.

Embodiments of the inventive concept provide a display panel including a base substrate, a driving circuit, and a cover layer defining a cavity. The base substrate includes a pixel area and a peripheral area adjacent to the pixel area.

The pixel area includes a display area and a circuit area. The driving circuit is disposed on the circuit area.

The color filter is disposed on the base substrate, and the pixel area thereof, to at least partially cover the driving circuit. The color filter is disposed at least on the pixel area and includes a depression positioned at least partially within the circuit area. A black matrix is disposed on the color filter and upon the depression.

A display element is disposed on the color filter and overlapping the display area. The cavity is at least partially positioned within the display area. The display element is disposed inside the cavity. The display element includes a pixel electrode disposed on the color filter, a common electrode disposed under the roof layer, and a liquid crystal layer disposed between the pixel electrode and the common electrode.

An alignment layer is disposed inside the cavity to align liquid crystal molecules of the liquid crystal layer. The alignment layer is disposed on the pixel electrode and the common electrode.

The black matrix is inserted upon the depression to substantially planarize the stepped portion.

The cavity includes a first inlet portion adjacent to the driving circuit and a second inlet portion facing the first inlet portion.

The alignment layer blocks or covers one of the first inlet portion and the second inlet portion. When the alignment layer blocks or covers the first inlet portion, a thickness of the roof layer proximate to the first inlet portion is greater than a thickness of the roof layer proximate to the second inlet portion.

Embodiments of the inventive concept provide a method of manufacturing the display panel including: forming a driving circuit on a circuit area of a base substrate, the base substrate including a pixel area and a peripheral area adjacent to the pixel area, the pixel area including a display area and the circuit area; forming a color filter on the pixel area, the color filter at least partially covering the driving circuit and including with a depression positioned at least partially within the circuit area; forming a black matrix on the color filter and upon the depression; forming a cavity on the color filter, the cavity being at least partially defined by a roof layer, forming an alignment layer inside the cavity, and forming a liquid crystal layer inside the cavity.

The forming a color filter further includes forming a base layer on the pixel area, and forming the depression on the base layer using a mask having both a slit area with slits and corresponding to the circuit area, and a light blocking area corresponding to the display area.

The forming a black matrix further includes depositing a black ink onto the depression so as to substantially planarize the stepped portion.

The forming a cavity further includes forming a sacrificial layer on the color filter to at least partially overlap the display area, forming the roof layer on the sacrificial layer to expose ends of the sacrificial layer, where the ends face each other, and removing the sacrificial layer.

The method further includes, between the forming a sacrificial layer and the forming a roof layer, forming a common electrode positioned so as to expose the ends of the sacrificial layer.

The forming an alignment layer further includes applying a liquid alignment material to the circuit area, allowing the liquid alignment material to enter into the cavity, and drying the liquid alignment material.

According to the above, the area of the inlet portion of the cavity, which is adjacent to the circuit area, is determined by the shape of the alignment layer. The cross-sectional area of the inlet portion contributes to determination of the position of the shielding wall of the alignment layer with respect to the cavity. The black matrix is inserted into the depression of the color filter, which prevents the black matrix material from obstructing the inlet portion of the cavity. Thus, the shielding wall of the alignment layer may be prevented from being formed in a center portion of the cavity.

BRIEF DESCRIPTION OF THE DRAWINGS

The above and other advantages of the present disclosure will become readily apparent by reference to the following detailed description when considered in conjunction with the accompanying drawings, wherein.

The various Figures are not necessarily to scale.

DETAILED DESCRIPTION

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be explained in detail with reference to the accompanying drawings.

Figure 1:
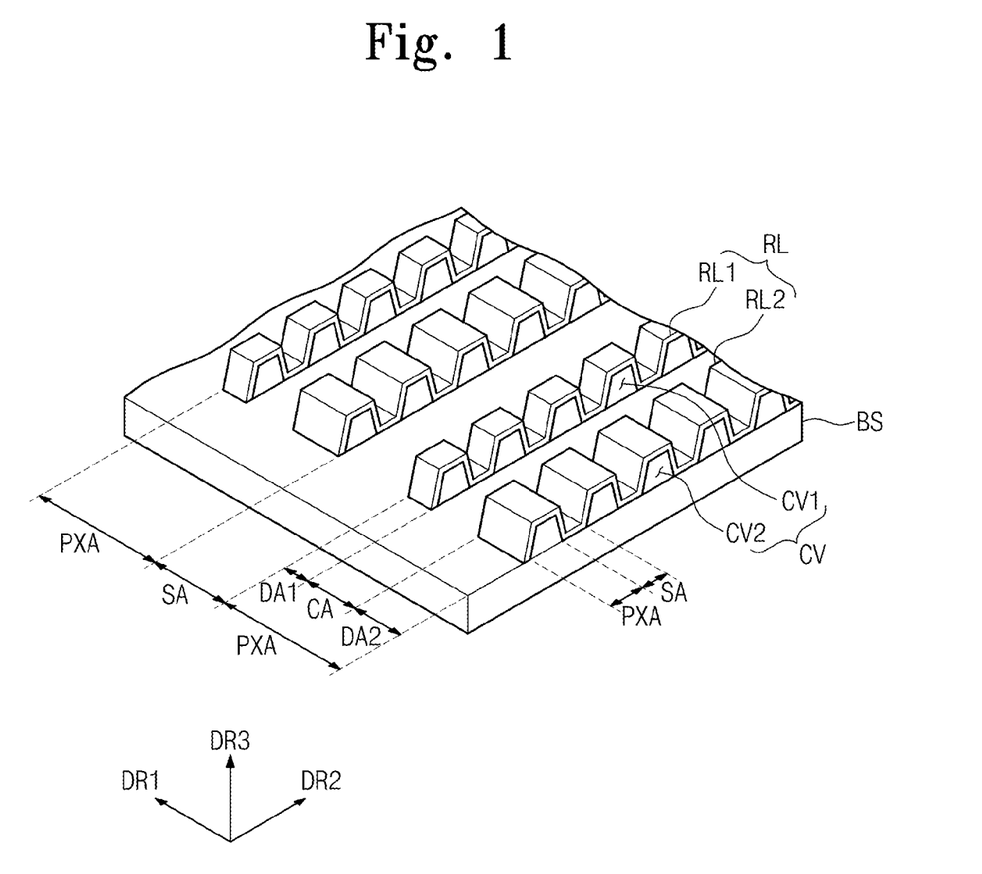
FIG. 1 is a perspective view showing a portion of a display panel according to an exemplary embodiment of the present disclosure.
Figure 2:
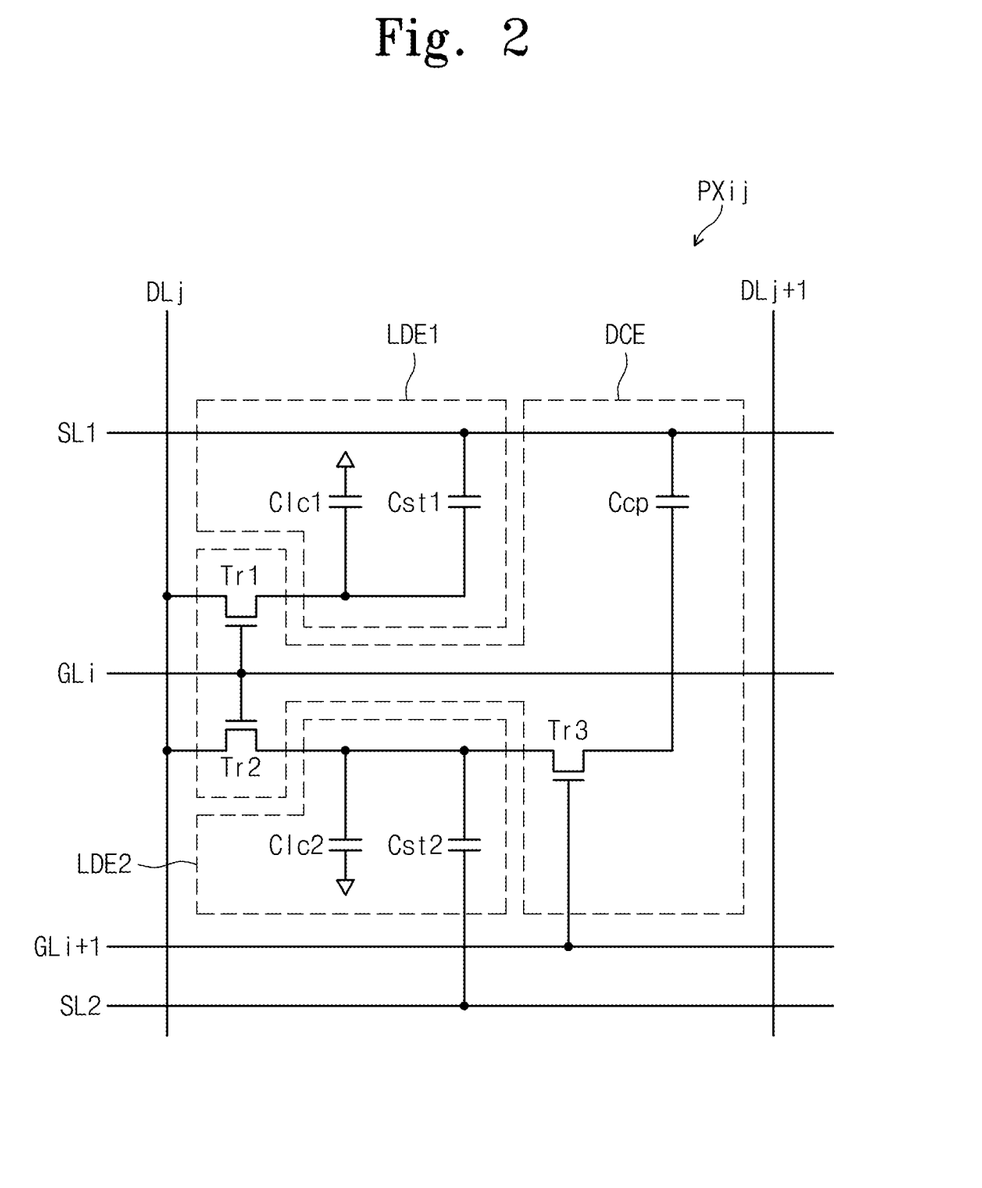
FIG. 2 is an equivalent circuit diagram showing a pixel according to an exemplary embodiment of the present disclosure.

FIG. 1 is a perspective view showing a portion of a display panel according to an exemplary embodiment of the present disclosure and FIG. 2 is an equivalent circuit diagram showing a pixel according to an exemplary embodiment of the present disclosure.

A display panel according to the present exemplary embodiment of the present disclosure includes a base substrate BS, a plurality of pixels (not shown) disposed on the base substrate BS, and a roof layer RL defining a plurality of cavities CV.

The base substrate BS includes a plurality of pixel areas PXA and a peripheral area SA disposed adjacent to the pixel areas PXA. The pixels are disposed to correspond to the pixel areas PXA, respectively.

Each of the pixel areas PXA includes a display area DA1 and DA2, and a circuit area CA. The display area DA1 and DA2 includes a first display area DA1 and a second display area DA2, which are spaced apart from each other while interposing the circuit area CA therebetween. A first display element (not shown) and a second display element (not shown) are disposed in each first display area DA1 and second display area DA2 respectively, and a driving circuit (not shown) is disposed in each corresponding circuit area CA to control the first and second display elements. Details thereof will be described below.

Signal lines (not shown) are disposed in the peripheral areas SA. The signal lines are configured to include a plurality of gate lines (not shown) that extend lengthwise in a first direction DR1 and are arranged side by side along a second direction DR2 substantially perpendicular to the first direction DR1. The signal lines also include a plurality of data lines (not shown) that extend lengthwise in the second direction DR2 and are arranged side by side along the first direction DR1. In addition, the signal lines may further include a plurality of storage lines extending lengthwise in the first direction DR1.

The roof layer RL includes a first roof layer RL1 disposed in the first display area DA1 and a second roof layer RL2 disposed in the second display area DA2. The first roof layer RL1 forms first cavities CV1 to correspond to the first display areas DA1 and the second roof layer RL2 forms second cavities CV2 to correspond to the second display areas DA2. The first cavities CV1 and the second cavities CV2 are formed so as to extend upward in a thickness direction DR3 (hereinafter, referred to as a third direction) of the base substrate BS.

The roof layer RL is disposed to commonly correspond to pixels arranged in the first direction DR1, i.e., pixels arranged in one pixel row. That is, a single continuous roof layer RL covers each of the pixels in one pixel row. The roof layer RL may be disposed not only in the pixel area PXA but also in the peripheral area SA between adjacent pixels arranged in the one pixel row.

A liquid crystal layer (not shown) is disposed in the first cavities CV1 and the second cavities CV2. An alignment direction of liquid crystal molecules of the liquid crystal layer is changed in accordance with an electric field generated between the first display element and the second display element.

FIG. 2 shows the equivalent circuit diagram of one pixel PXij. The pixel PXij is connected to an i-th gate line GLi and an (i+1)th gate line GLi+1 of the gate lines and a j-th data line DLj of the data lines. In addition, the pixel PXij is connected to two adjacent storage lines SL1 and SL2 (hereinafter, referred to as a first storage line and a second storage line). However, the equivalent circuit diagram of the one pixel PXij should not be limited thereto or thereby, and any other pixel configuration is contemplated.

The pixel PXij includes the driving circuit DCE, the first display element LDE1, and the second display element LDE2. The driving circuit DCE includes a first thin film transistor TR1 and a second thin film transistor TR2, which are connected to the i-th gate line GLi and the j-th data line DLj. The driving circuit DCE also includes a third thin film transistor TR3, which in this embodiment is turned on at a timing different from that of the second thin film transistor TR2, as well as a coupling capacitor Ccp to control a level of a voltage charged in the second display element LDE2.

The first display element LDE1 includes a first liquid crystal capacitor Clc1 and a first storage capacitor Cst1. The second display element LDE2 includes a second liquid crystal capacitor Clc2 and a second storage capacitor Cst2. The first liquid crystal capacitor Clc1 is connected in parallel with the first storage capacitor Cst1 (in the sense that both have a terminal connected to the output terminal of transistor Tr1), and the second liquid crystal capacitor Clc2 is connected in parallel with the second storage capacitor Cst2 (in the same sense as that of the capacitors Clc1 and Cst1).

When the first thin film transistor Tr1 and the second thin film transistor Tr2 are turned on in response to the gate signal applied to the i-th gate line GLi, the data signal applied to the j-th data line DLj is applied to the first display element LDE1 and the second display element LDE2 through the first thin film transistor Tr1 and the second thin film transistor Tr2, respectively. The first display element LDE1 and the second display element LDE2 are then charged with voltages corresponding to the data signal.

Then, when the third thin film transistor Tr3 is turned on in response to the gate signal applied to the (i+1)th gate line GLi+1, a voltage division occurs between the second liquid crystal capacitor Clc2 and the coupling capacitor Ccp. That is, the voltage charged in the second liquid crystal capacitor Clc2 is lowered. Consequently, after the gate signal is applied to the (i+1)th gate line GLi+1, the first liquid crystal capacitor Clc1 is charged with a voltage at a first level, and the second liquid crystal capacitor Clc2 is charged with a voltage at a second level that is lower than the first level. Due to this voltage difference, the liquid crystal molecules included in the first display element LDE1 have a different alignment direction from that of the liquid crystal molecules included in the second display element LDE2. As a result, the pixel PXij provides a wider viewing angle.

Figure 3:
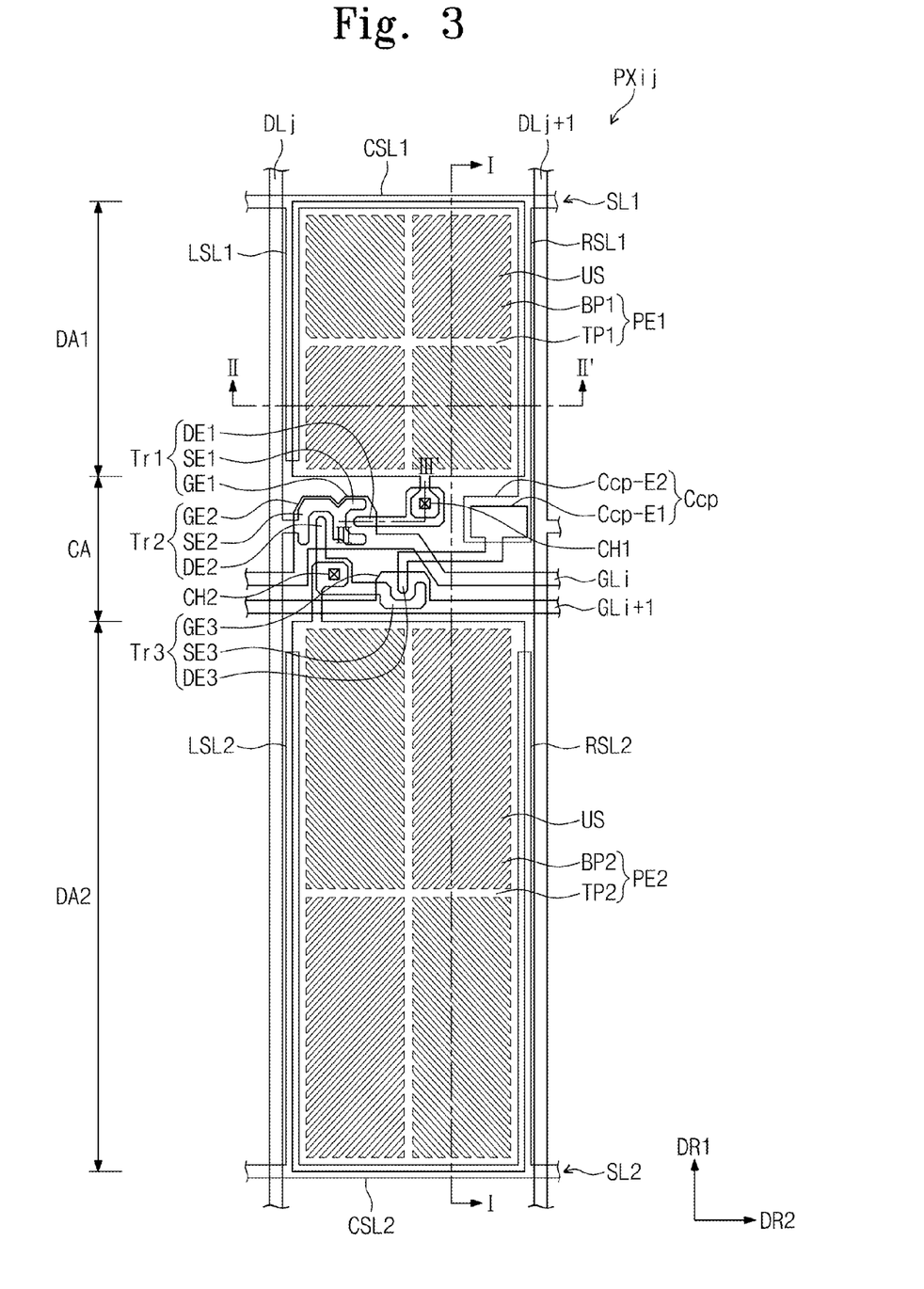
FIG. 3 is a plan view showing the pixel according to an exemplary embodiment of the present disclosure.
Figure 4:
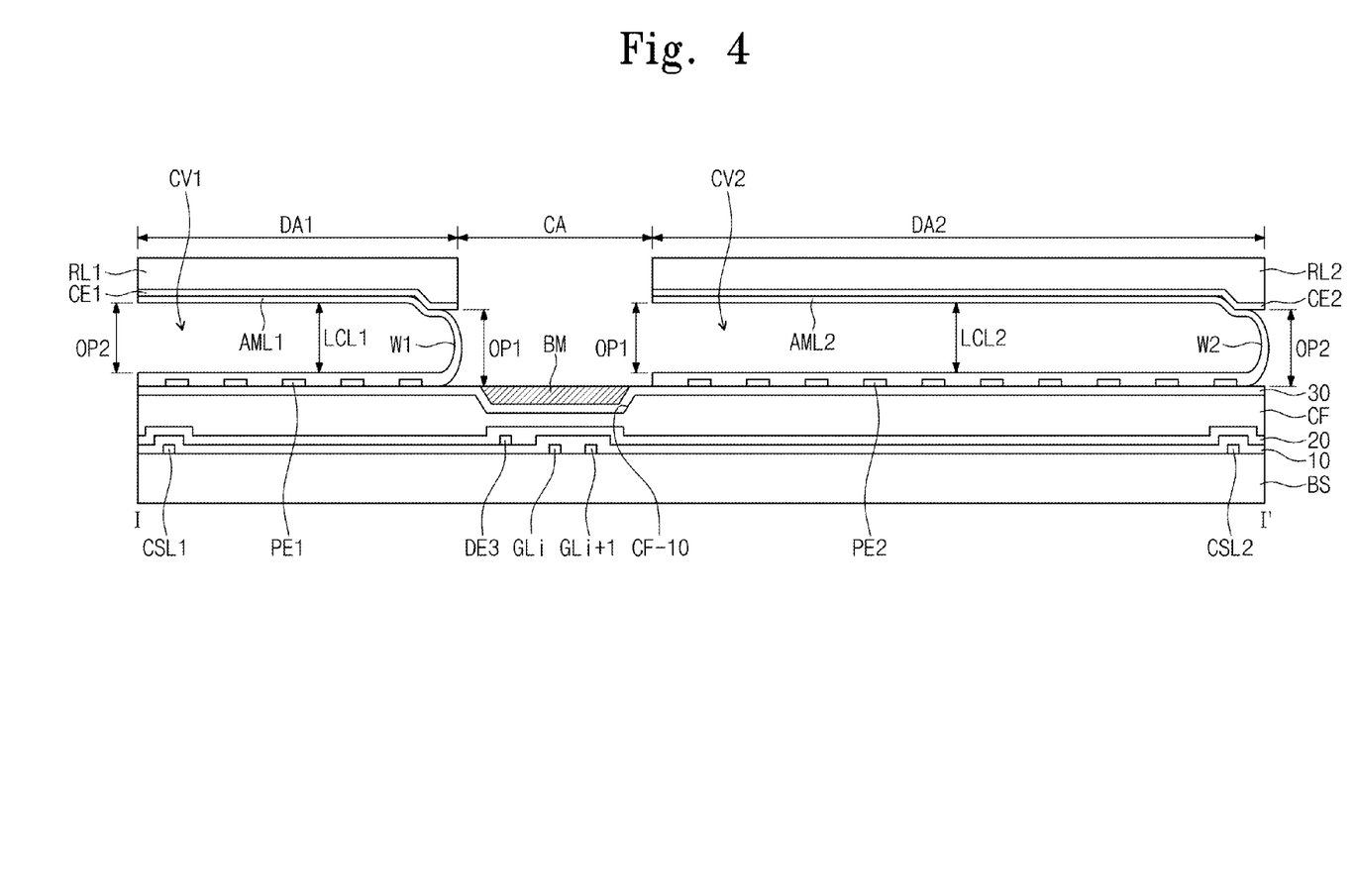
FIG. 4 is a cross-sectional view taken along a line I-I' of FIG. 3.
Figure 5:
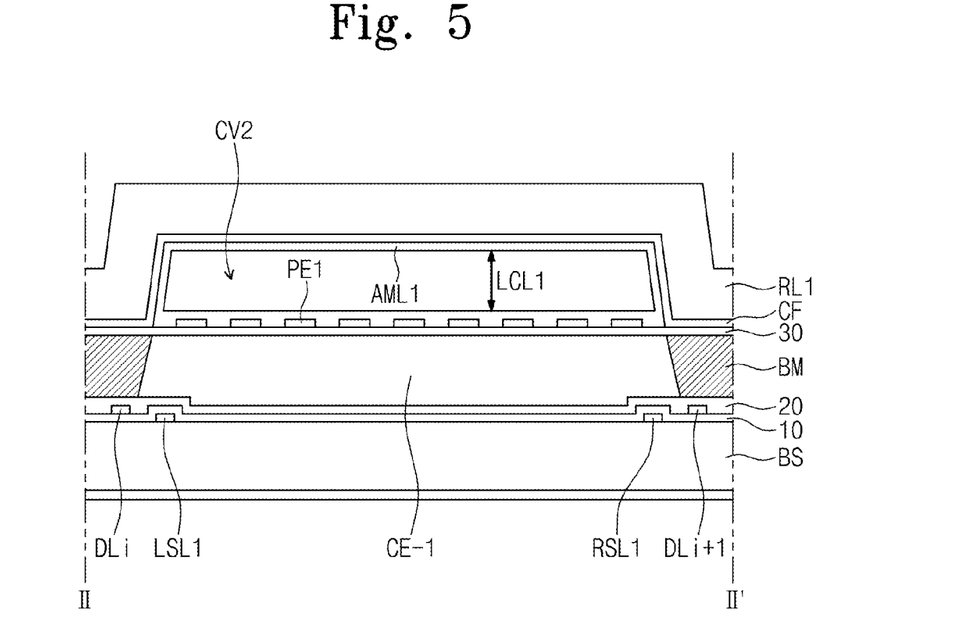
FIG. 5 is a cross-sectional view taken along a line II-II' of FIG. 3.
Figure 6:
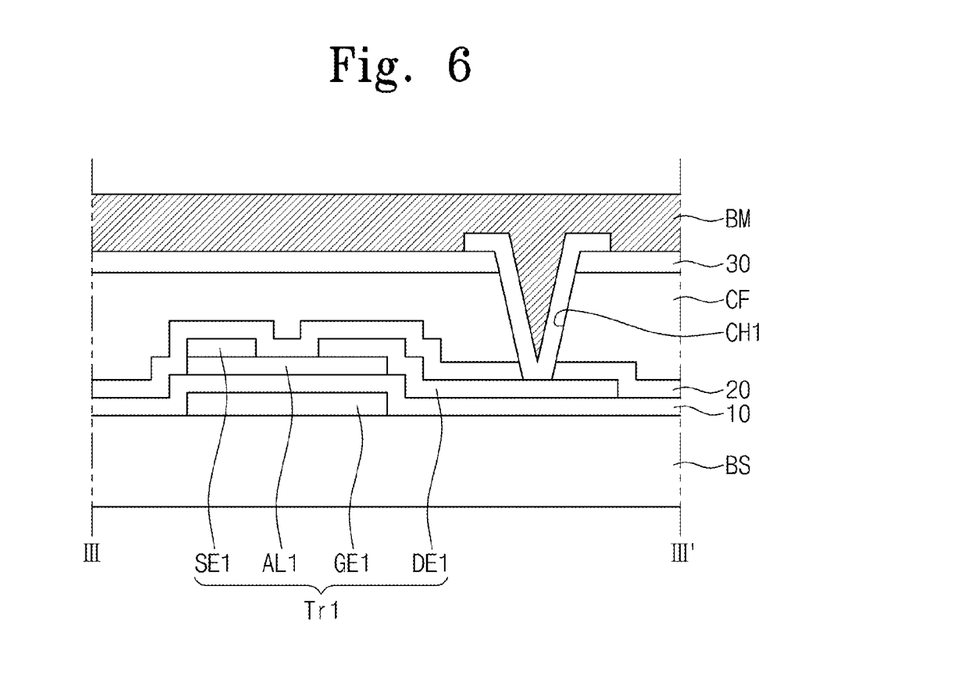
FIG. 6 is a cross-sectional view taken along a line III-III' FIG. 3.

FIG. 3 is a plan view showing a pixel according to an exemplary embodiment of the present disclosure. FIG. 4 is a cross-sectional view taken along a line I-I' of FIG. 3. FIG. 5 is a cross-sectional view taken along a line of II-II' FIG. 3. FIG. 6 is a cross-sectional view taken along a line III-III' of FIG. 3. The pixel shown in FIGS. 3 to 6 has the equivalent circuit diagram shown in FIG. 2. Hereinafter, the pixel according to the present exemplary embodiment of the present disclosure will be described in detail with reference to FIGS. 3 to 6.

Referring to FIGS. 3 to 6, the driving circuit DCE is disposed in the circuit area CA. The i-th gate line GLi and the j-th data line DLj are disposed on a surface of the base substrate BS. A gate electrode GE1 of the first thin film transistor Tr1 is branched out from the i-th gate line GLi, and a gate electrode GE3 of the third thin film transistor Tr3 is branched out from the (i+1)th gate line GLi+1.

The first storage line SL1 and the second storage line SL2 are disposed on the same layer as the i-th gate line GLi and the (i+1)th gate line GLi+1. The first storage line SL1 includes a trunk electrode CSL1, as well as a first branch electrode LSL1 and a second branch electrode RSL1 which extend from the trunk electrode CSL1. The second storage line SL2 includes a trunk electrode CSL2, as well as a first branch electrode LSL2 and a second branch electrode RSL2 which extend from the trunk electrode CSL2.

The trunk electrode CSL1 of the first storage line SL1 is disposed substantially in parallel with the i-th gate line GLi and the (i+1)th gate line GLi+1. The first branch electrode LSL1 and the second branch electrode RSL1 of the first storage line SL1 are spaced apart from each other in the second direction DR2 but each extend substantially parallel to the data lines DLj, DLj+1.

One electrode Ccp-E2 (hereinafter, referred to as a second electrode) of the coupling capacitor Ccp is disposed on the base substrate BS. The second electrode Ccp-E2 is connected to the second branch electrode RSL1 of the first storage line SL1.

A first insulating layer 10 is disposed on the base substrate BS to cover the i-th gate line GLi and the (i+1)th gate line GLi+1. The j-th data line DLj and a (j+1)th data line DLj+1 are disposed on the first insulating layer 10.

A semiconductor layer is disposed on the first insulating layer 10. In FIG. 6, a semiconductor layer AL1 of the first thin film transistor Tr1 has been shown as an exemplary embodiment. Although not shown in the figures, semiconductor layers of the second thin film transistor Tr2 and the third thin film transistor Tr3 are also disposed on the first insulating layer 10.

A source electrode SE1 of the first thin film transistor Tr1 and a source electrode SE2 of the second thin film transistor Tr2 are branched from the j-th data line DLj. A drain electrode DE1 of the first thin film transistor Tr1 and a drain electrode DE2 of the second thin film transistor Tr2 are disposed on the first insulating layer 10. The source electrode SE1 and the drain electrode DE1 of the first thin film transistor Tr1 are overlapped with the semiconductor layer AL1.

A source electrode SE3 of the third thin film transistor Tr3 is connected to the drain electrode DE2 of the second thin film transistor Tr2. A drain electrode DE3 of the third thin film transistor Tr3 is connected to the other electrode Ccp-E1 (hereinafter, referred to as a first electrode) of the coupling capacitor Ccp.

A second insulating layer 20 is disposed on the first insulating layer 10 to cover the j-th data line DLj and the (j+1)th data line DLj+1. A color filter CF is disposed on the second insulating layer 20 to cover the driving circuit DCE. The color filter CF overlaps not only the circuit area CA but also the first display area DA1 and the second display area DA2.

The color filter CF includes a stepped portion CF-10 that overlaps (i.e. is positioned at least partially within) the circuit area CA. The stepped portion CF-10 forms a depression that controls a height of a black matrix BM with respect to inlet portions of the first cavity CV1 and the second cavity CV2, as will be described below.

A shape of the stepped portion CF-10 or depression should not be limited to the above-mentioned shape shown in FIG. 4. For instance, the stepped portion CF-10 may partially expose (i.e. expose some portion of) the second insulating layer 20.

A third insulating layer 30 is disposed on the color filter CF. The third insulating layer 30 protects the color filter CF from contaminants and moisture. The third insulating layer 30 may be, but is not limited to, an inorganic layer. The third insulating layer 30 may include at least one of silicon oxide and silicon nitride.

The third insulating layer 30 is a thin film layer disposed on the color filter CF. Unlike other portions of the color filter CF, the stepped portion CF-10 or depression is not planarized by the third insulating layer 30. The third insulating layer 30 maintains the stepped portion CF-10; that is, the third insulating layer 30 has a stepped portion or depression corresponding to the same area as the stepped portion CF-10 or depression of the color filter CF. Meanwhile, the third insulating layer 30 may be omitted in various embodiments.

The black matrix BM is disposed on the third insulating layer 30. The black matrix BM is overlapped with the stepped portion CF-10. In particular, the black matrix BM is inserted into the depression, or stepped portion CF-10.

The stepped portion CF-10 is planarized by the black matrix BM to correspond in height to the other portions of the color filter CF. It is desirable for black matrix BM not to protrude above the upper surface of the third insulating layer 30 in the circuit area CA. An upper surface of the black matrix BM may be located at approximately the same level as the upper surface of the third insulating layer 30 of the first display area DA1 and the second display area DA2.

The black matrix BM may be disposed to overlap not only the circuit area CA but also the peripheral area SA. A portion of the black matrix BM, which overlaps the peripheral area SA, also covers one or more signal lines, e.g., the j-th data line DLj and the (j+1)th data line DLj+1.

The first display element LDE1 (refer to FIG. 2) and the second display element LDE2 (refer to FIG. 2) connected to the driving circuit DCE (refer to FIG. 2) are disposed in the first display area DA1 and the second display area DA2, respectively. When viewed in a plan view, the second display area DA2 may have an area greater than that of the first display area DA1.

The first liquid crystal capacitor Clc1 includes a first pixel electrode PE1, a first common electrode CE1, and a first liquid crystal layer LCL1 interposed between the first pixel electrode PE1 and the first common electrode CE1. The first pixel electrode PE1 is disposed on the third insulating layer 30 to overlap with the first display area DA1. The first common electrode CE1 is disposed under the first roof layer RL1 that defines the first cavity CV1. The first common electrode CE1 is disposed under an inner surface of the first roof layer RL1. In another exemplary embodiment of the present disclosure, the first common electrode CE1 may be disposed on the base substrate BS according to an operational mode of the pixel PX.

The first pixel electrode PE1 is connected to the drain electrode DE1 of the first thin film transistor Tr1 through a first contact hole CH1. As shown in FIG. 6, the first contact hole CH1 is formed to extend through the second insulating layer 20, the color filter CF, and the third insulating layer 30. The first contact hole CH1 may be one thru-hole configured to include a thru-hole formed through the second insulating layer 20, a thru-hole formed through the color filter CF, and a thru-hole formed through the third insulating layer 30. A shape of the first contact hole CH1 may be changed according to the manufacturing process thereof.

The first pixel electrode PE1 and the first storage line SL1 partially overlap each other while interposing the first insulating layer 10, the second insulating layer 20, the color filter CF, and the third insulating layer 30 therebetween. The first pixel electrode PE1, the first storage line SL1, and insulating materials disposed therebetween form the first storage capacitor Cst1.

The first pixel electrode PE1 includes a first trunk part TP1 to divide the first display area DA1 into a plurality of domains, and a plurality of first branch parts BP1 extend from the first trunk part TP1 in a radial direction. The first trunk part TP1 may have a cross shape as shown in the present exemplary embodiment of the present disclosure. The first display area DA1 may be divided into four domains by the first trunk part TP1.

The first branch parts BP1 extend substantially in parallel with each other and spaced apart from each other within each of the four domains. The four domains include first branch parts BP1 inclined at an angle of about 45 degrees, about 135 degrees, about 225 degrees, and about 315 degrees, respectively, with respect to a horizontal portion of the first trunk part TP1. The first branch parts BP1 adjacent to each other are spaced apart from each other by a distance of a micrometer unit to form a number of fine slits US. The liquid crystal molecules of the first liquid crystal layer LCL1 are pre-tilted in different directions in each domain by the fine slits US.

The second liquid crystal capacitor Clc2 includes a second pixel electrode PE2, a second common electrode CE2, and a second liquid crystal layer LCL2 interposed between the second pixel electrode PE2 and the second common electrode CE2. The second pixel electrode PE2 is disposed on the third insulating layer 30 in the second display area DA2. The second common electrode CE2 is disposed under the second roof layer RL2 that defines the second cavity CV2.

The second pixel electrode PE2 is connected to the source electrode SE3 of the third thin film transistor Tr3 through a second contact hole CH2. Although not shown in the figures, the second contact hole CH2 may have the same structure as that of the first contact hole CH1 shown in FIG. 6. The second pixel electrode PE2, the second storage line SL2, and insulating materials disposed therebetween form the second storage capacitor Cst2.

The second pixel electrode PE2 includes a second trunk part TP2 to divide the second display area DA2 into a plurality of domains, and a plurality of second branch parts BP2 that extend from the second trunk part TP2 in a radial direction. The second display area DA2 may be divided into four domains by the second trunk part TP2.

Each of the first cavity CV1 and the second cavity CV2 includes a first inlet portion OP1 and a second inlet portion OP2. An inlet portion adjacent to the circuit area CA is referred to as the first inlet portion OP1. The first and second cavities CV1 and CV2 each have a tunnel shape extended along (i.e. having a major axis generally parallel to) the first direction DR1. The first inlet portion OP1 and the second inlet portion OP2 face each other in the first direction DR1.

The first roof layer RL1 and the second roof layer RL2 may have different thicknesses from each other along the first direction DR1. In area DA1, the thickness of the first roof layer RL1 in the first inlet portion OP1 is greater than the thickness of the first roof layer RL1 in the second inlet portion OP2. That is, as shown in FIG. 4, the first roof layer RL1 may have a stepped portion at the first inlet portion OP1. In area DA2, the thickness of the second roof layer RL2 in the first inlet portion OP1 is smaller than the thickness of the second roof layer RL2 in the second inlet portion OP2.

In another exemplary embodiment of the present disclosure, the shape of the first and second roof layers RL1 and RL2 may be changed. For instance, the first roof layer RL1 may have a relatively greater thickness in the second inlet portion OP2, and the second roof layer RL2 may have a relatively smaller thickness in the second inlet portion OP2.

The first common electrode CE1 and the second common electrode CE2, which are respectively disposed under the first and second roof layers RL1 and RL2, are connected to a common voltage line (not shown) disposed at an edge portion of the base substrate BS. The first common electrode CE1 and the second common electrode CE2 receive a common voltage through the common voltage line.

The pixel electrodes PE1 and PE2 and the common electrodes CE1 and CE2 can include a transparent conductive material. The display panel DP receives a light from a backlight unit disposed under the base substrate BS. Each of the first liquid crystal layer LCL1 and the second liquid crystal layer LCL2 respectively disposed in the first cavity CV1 and the second cavity CV2 transmits or blocks the light provided from the backlight unit according to the electric field formed between the pixel electrodes PE1 and PE2 and the common electrodes CE1 and CE2.

The first liquid crystal layer LCL1 is aligned by a first alignment layer AML1 disposed in the first cavity CV1. The first alignment layer AML1 is formed on the third insulating layer 30 and inside of the first cavity CV1. The first alignment layer AML1 covers the first pixel electrode PE1 and the first common electrode CE1.

The first alignment layer AML1 may block one of the first inlet portion OP1 and the second inlet portion OP2 of the first cavity CV1. The first alignment layer AML1 has a tunnel shape having one entrance.

As shown in FIG. 4, the first alignment layer AML1 may block the first inlet portion OP1 of the first cavity CV1. Since the first inlet portion OP1 has an area smaller than that of the second inlet portion OP2, a shielding wall W1 of the first alignment layer AML1 is formed in the first inlet portion OP1. For the same reason, a shielding wall W2 of a second alignment layer AML2 in the second cavity CV2 is formed in the second inlet portion OP2.

The first alignment layer AML1 and the second alignment layer AML2 include an alignment material, such as polyimide. The shapes of the first alignment layer AML1 and the second alignment layer AML2 are determined by the areas of the first inlet portions OP1 of the first cavity CV1 and the second cavity CV2, which are adjacent to the circuit area CA. A position of each of the shielding walls W1 and W2 of the first and second alignment layers AML1 and AML2 in the first direction DR1 is determined by the areas of the first inlet portions OP1.

In a case that the black matrix BM extends above the color filter CF in the circuit area CA, the areas of the first inlet portions OP1 become smaller. When the areas of the first inlet portions OP1 become smaller, the shielding wall W1 of the first alignment layer AML1 and the shielding wall W2 of the second alignment layer AML2 are respectively formed in the middle of the first cavity CV1 and the second cavity CV2, rather than being formed at the inlet portions OP1 and OP2. Shielding walls W1 and W2 formed in the middle of the first cavity CV1 and the second cavity CV2 may prevent the liquid crystal molecules from being injected properly. Also, the injected liquid crystal molecules are not evenly aligned. Thus, defective pixels are generated.

Due to the stepped portion CF-10 of, or depression in, the color filter, the height of the black matrix BM becomes lower to secure the areas of the first inlet portions OP1. Thus, the shielding wall W1 of the first alignment layer AML1 and the shielding wall W2 of the second alignment layer AML2 are formed adjacent to the second inlet portions OP2 of the first cavity CV1 and the second cavity CV2.

Meanwhile, although not shown in the figures, a sealing layer may be further disposed on the roof layer RL. The sealing layer covers the pixel area PXA and the peripheral area SA. The sealing layer seals the first cavity CV1 and the second cavity CV2. The sealing layer may include organic polymer. For example, poly(p-xylene)polymer, i.e., parylene, may be used for the sealing layer.

Figure 7:
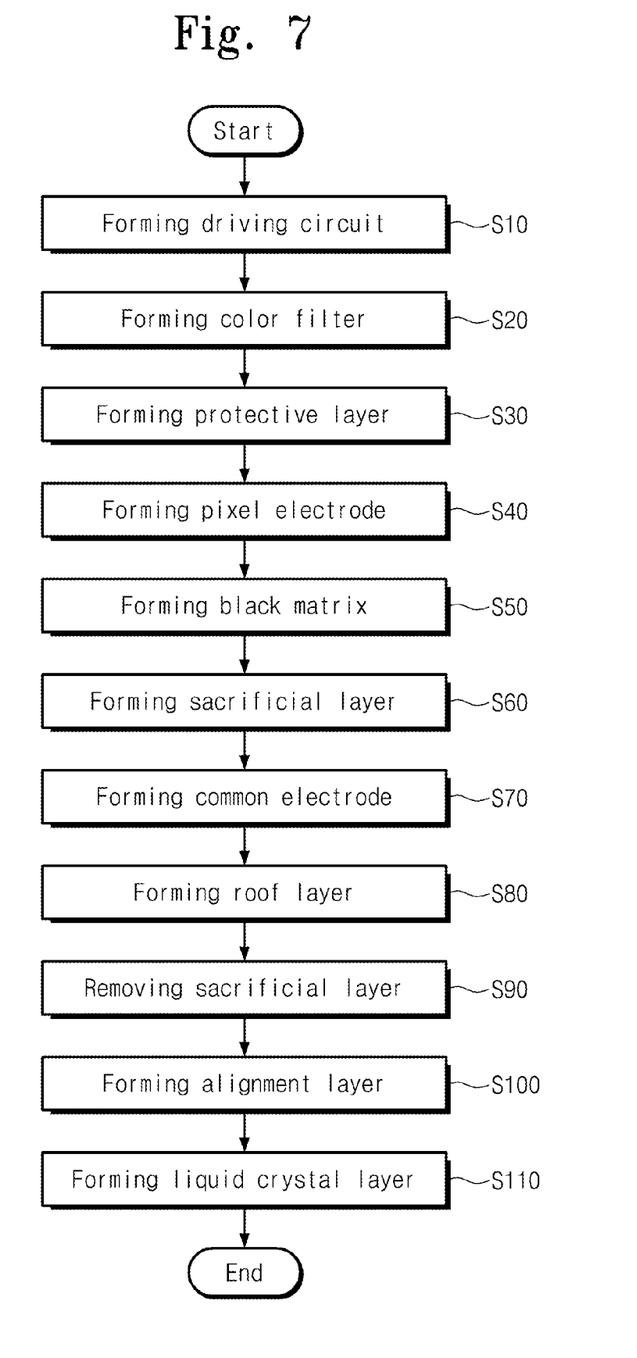
FIG. 7 is a flow chart showing a manufacturing process of the display panel according to an exemplary embodiment of the present disclosure.

FIG. 7 is a flow chart showing a manufacturing process of a display panel according to an exemplary embodiment of the present disclosure. Hereinafter, the manufacturing process of the display panel according to the present exemplary embodiment of the present disclosure will be described with reference to FIG. 7. In FIG. 7, the same reference numerals denote the same elements as in FIGS. 1 to 6.

A method of manufacturing the display panel according to an exemplary embodiment of the present disclosure includes forming the driving circuit DCE on the base substrate BS, forming the color filter CF on the base substrate BS, forming the pixel electrodes PE1 and PE2 on the color filter CF, forming the black matrix BM, forming the cavities CV1 and CV2, forming the alignment layers AML1 and AML2 inside the cavities CV1 and CV2, and forming the liquid crystal layers LCL1 and LCL2 inside the cavities CV1 and CV2.

First, the driving circuit DCE is formed in the circuit area CA of the base substrate BS (S10). The signal lines are substantially simultaneously formed with the driving circuit DCE.

In further detail, a conductive layer (not shown) is formed on the surface of the base substrate BS using a sputtering method, and the signal lines and the electrodes are formed using a photolithography process and an etching process. The i-th gate line GLi, the (i+1)th gate line GLi+1, and the gate electrode GE1 connected to the i-th gate line GLi are formed by the above-described processes. The signal lines and the electrodes disposed on the same layer as the i-th gate line GLi, the (i+1)th gate line GLi+1, and the gate electrode GE1, which are described with reference to FIGS. 3 to 6, may be formed using the same procedure.

Next, the first insulating layer 10 is formed on the surface of the base substrate BS. The first insulating layer 10 includes silicon nitride or silicon oxide. The first insulating layer 10 may be formed using a plasma-enhanced chemical vapor deposition (PECVD) method.

The semiconductor layer AL1 is then formed on the first insulating layer 10. After a silicon layer is formed using the PECVD method, the silicon layer is patterned using a photolithography process and an etching process.

Then, a conductive layer (not shown) is formed using the sputtering method, and a photolithography process and an etching process are performed on the conductive layer. Through the above-described processes, the j-th data line DLj and the (j+1)th data line DLj+1 are formed. The signal lines and the electrodes disposed on the same layer as the j-th data line DLj and the (j+1)th data line DLj+1, which are described with reference to FIGS. 3 to 6, may be formed using the same procedure.

The second insulating layer 20 is next formed on the base substrate BS. The second insulating layer 20 includes silicon nitride or silicon oxide. The second insulating layer 20 may be formed using a PECVD method.

Thus, the driving circuit DCE is manufactured through the above-described processes. Some processes among the above-described processes may be omitted or other thin film processes may be further performed, or performed instead. In addition, a thru-hole may be formed through the insulating layer to expose a portion of the driving circuit DCE.

The color filter CF having the stepped portion CF-10 is then formed on the second insulating layer 20 (S20).

Figure 8:
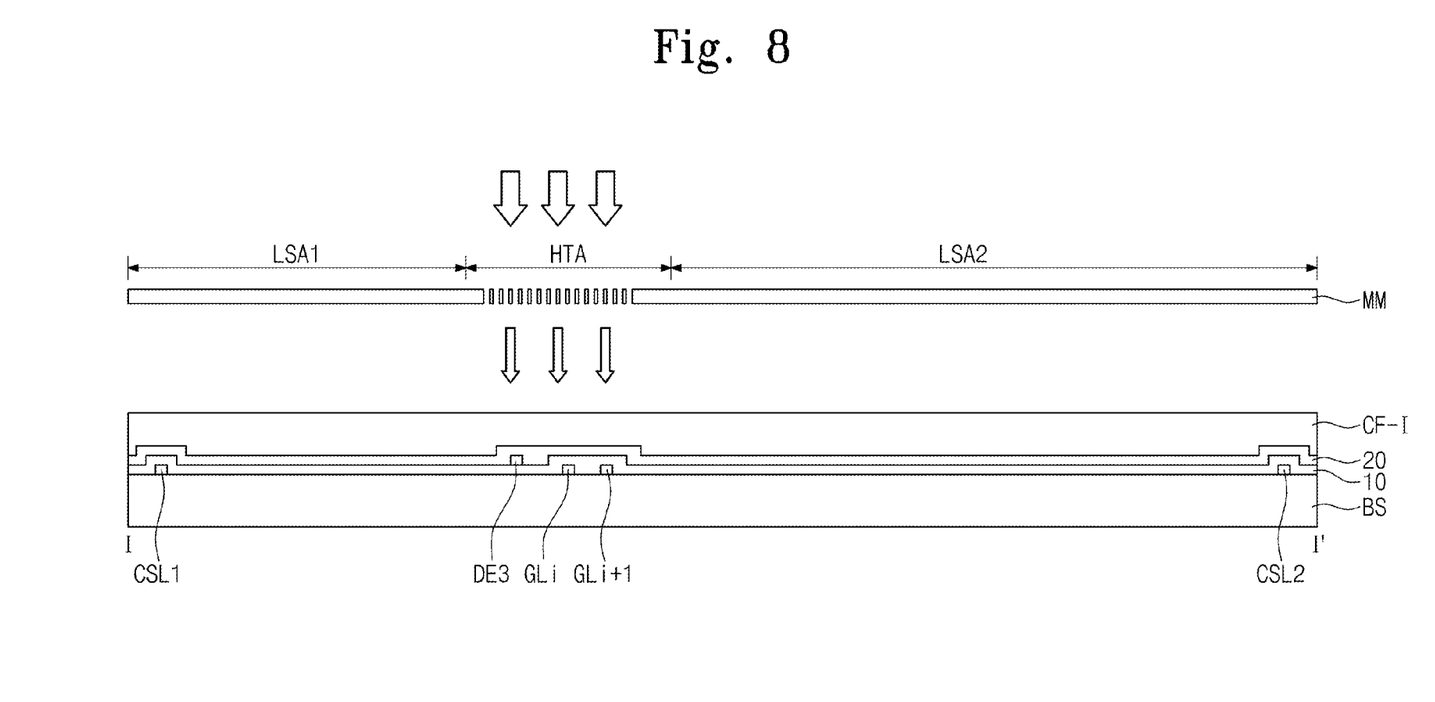
FIG. 8 is a cross-sectional view showing one process of processes used to form a color filter according to an exemplary embodiment of the present disclosure.
Figure 9:
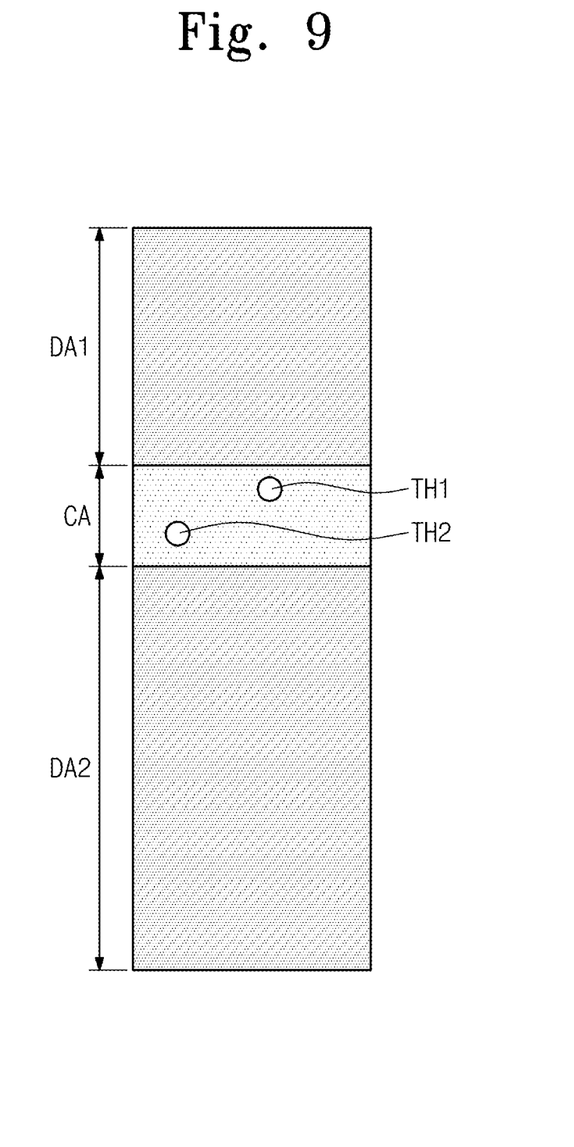
FIG. 9 is a plan view showing the color filter according to an exemplary embodiment of the present disclosure.

FIG. 8 is a cross-sectional view showing a manufacturing process of the color filter CF according to an exemplary embodiment of the present disclosure. FIG. 9 is a plan view showing the color filter CF according to an exemplary embodiment of the present disclosure. Details of the manufacturing process used to form the color filter will be described with reference to FIGS. 8 and 9.

A base layer CF-I is formed on the second insulating layer 20 to overlap with the pixel area PXA. The base layer CF-I is an organic mixture including pigments, dyes, and photosensitive materials, etc., and is formed on the second insulating layer 20 using a coating method or a printing method.

The base layer CF-I is patterned using a mask MM. As an exemplary embodiment, a patterning process performed on the base layer CF-I using a positive photosensitive material will be described. However, other embodiments are contemplated, and the patterning process can also utilize a negative photosensitive material, for example.

The mask MM includes light blocking areas LSA1 and LSA2, as well as a slit area HTA. The light blocking areas LSA1 and LSA2 include a first light blocking area LSA1 corresponding to the first display area DA1 and a second light blocking area LSA2 corresponding to the second display area DA2. Although not shown in the figures, the mask MM may include an opening overlapping the slit area HTA.

The base layer CF-I is exposed to a light and developed using the mask MM. The light is irradiated onto the base layer CF-I from above the mask MM. The irradiated light is thus provided to a portion of the base layer CF-I that lies in the circuit area CA and under the slit area HTA. An amount of the irradiated light provided to the portion of the base layer CF-I is reduced due to passing through the slits in the slit area HTA.

When the exposed base layer CF-I is developed, a thickness of an area to which the light is not irradiated is not changed, but a thickness of an area to which the light is irradiated is reduced. The area in which the thickness of the base layer CF-I is reduced serves as the stepped portion CF-10. A first thru-hole TH1 and a second thru-hole TH2 shown in FIG. 9 are formed to correspond to the opening of the mask MM. To form the first thru-hole TH1 and the second thru-hole TH2, a greater amount of the light than that of the light provided to the stepped portion CF-10 is provided to portions of the base layer CF-I, through which the first thru-hole TH1 and the second thru-hole TH2 are formed. The first thru-hole TH1 corresponds to a portion of the first contact hole CH1 shown in FIGS. 3 and 6, and the second thru-hole TH2 corresponds to a portion of the second contact hole CH2 shown in FIG. 3.

According to another embodiment, the base layer can include a negative photosensitive material, and may be patterned together with the color filter CF shown in FIG. 9 using a mask in which positions of the light blocking areas LSA1 and LSA2 and the opening are reversed as compared to the mask MM.

Next, the third insulating layer 30 is formed on the color filter CF to protect the color filter CF (S30). The third insulating layer 30 may be an inorganic layer. The third insulating layer 30 may be formed using a PECVD method. The third insulating layer 30 includes thru-holes corresponding to the first thru-hole TH1 and the second thru-hole TH2. The thru-holes of the third insulating layer 30 are formed by irradiating a laser beam onto the third insulating layer 30. In other embodiments, the process of forming the third insulating layer 30 may be omitted.

Then, the pixel electrodes PE1 and PE2 are formed on the third insulating layer 30 (S40). To this end, a transparent conductive layer is formed on the third insulating layer 30. The transparent conductive layer is patterned using a photography process and an etching process, to thereby form the pixel electrodes PE1 and PE2.

Next, the black matrix BM is formed on the color filter CF (S50). More specifically, an amount of black ink is deposited on the stepped portion CF-10 or depression of the color filter CF, and the black ink is then dried out. The black ink planarizes the stepped portion CF-10. The black matrix BM is formed using an inkjet printing method. The black ink may be printed on not only the circuit area CA but also the peripheral area SA.

The cavities CV1 and CV2 are then formed on the color filter CF. Hereinafter, a method for forming the cavities CV1 and CV2 will be described in further detail.

A sacrificial layer is formed on the third insulating layer 30 (S60). The sacrificial layer overlaps the first display area DA1 and the second display area DA2. The sacrificial layer includes a first sacrificial pattern and a second sacrificial pattern, which are respectively disposed in the first display area DA1 and the second display area DA2.

In another exemplary embodiment of the present disclosure, a groove may be further formed in each of the first and second sacrificial patterns. The groove helps shape the stepped portions of the common electrode and the roof layer. When a conductive layer is formed on the first and second sacrificial patterns, the conductive layer has a stepped portion due to the grooves in the first and second sacrificial patterns. The stepped portion of the conductive layer is transferred onto the roof layer.

Then, the common electrode is formed (S70). To this end, a transparent conductive layer is formed, and the transparent conductive layer is patterned using a photography process and an etching process to form the common electrode. Thus, the first common electrode CE1 and the second common electrode CE2, which are overlapped with the first sacrificial pattern and the second sacrificial pattern, respectively, are formed.

The first common electrode CE1 exposes both ends of the first sacrificial pattern, which face each other in the first direction DR1. The second common electrode CE2 exposes both ends of the second sacrificial pattern, which face each other in the first direction DR1. The first common electrode CE1 and the second common electrode CE2 are extended in the second direction DR2. The first common electrodes CE1 of pixels included in one pixel row are connected to each other, and the second common electrodes CE2 of pixels included in the one pixel row are connected to each other.

In another exemplary embodiment of the present disclosure, the first common electrode CE1 and the second common electrode CE2 may be formed in another manufacturing step according to an operational mode of the pixel PXij. For instance, the first common electrode CE1 and the second common electrode CE2 may be formed on the color filter CF before the third insulating layer 30 is formed.

Then, the roof layer RL is formed (S80). The base layer is formed on the base substrate BS, and is patterned to form the roof layer RL. The first roof layer RL1 and the second roof layer RL2 have substantially the same shapes as those of the first common electrode CE1 and the second common electrode CE2.

The first roof layer RL1 and the second roof layer RL2 cover the first common electrode CE1 and the second common electrode CE2, respectively. The first roof layer RL1 and the second roof layer RL2 expose both ends of each of the first sacrificial pattern and the second sacrificial pattern, respectively.

The sacrificial layer is then removed (S90). The first sacrificial pattern and the second sacrificial pattern are removed using a dry etching process or a wet etching process. The dry etching process may be performed using a plasma, and the wet etching process may be performed using various etchants according to the material used to form the sacrificial pattern. The removal of the first and second sacrificial patterns starts at both ends of the first and second sacrificial patterns. When the first sacrificial pattern and the second sacrificial pattern are removed, the first cavity CV1 and the second cavity CV2 are formed.

The alignment layer is then formed inside of the cavities CV1 and CV2 (S100).

Figure 10:
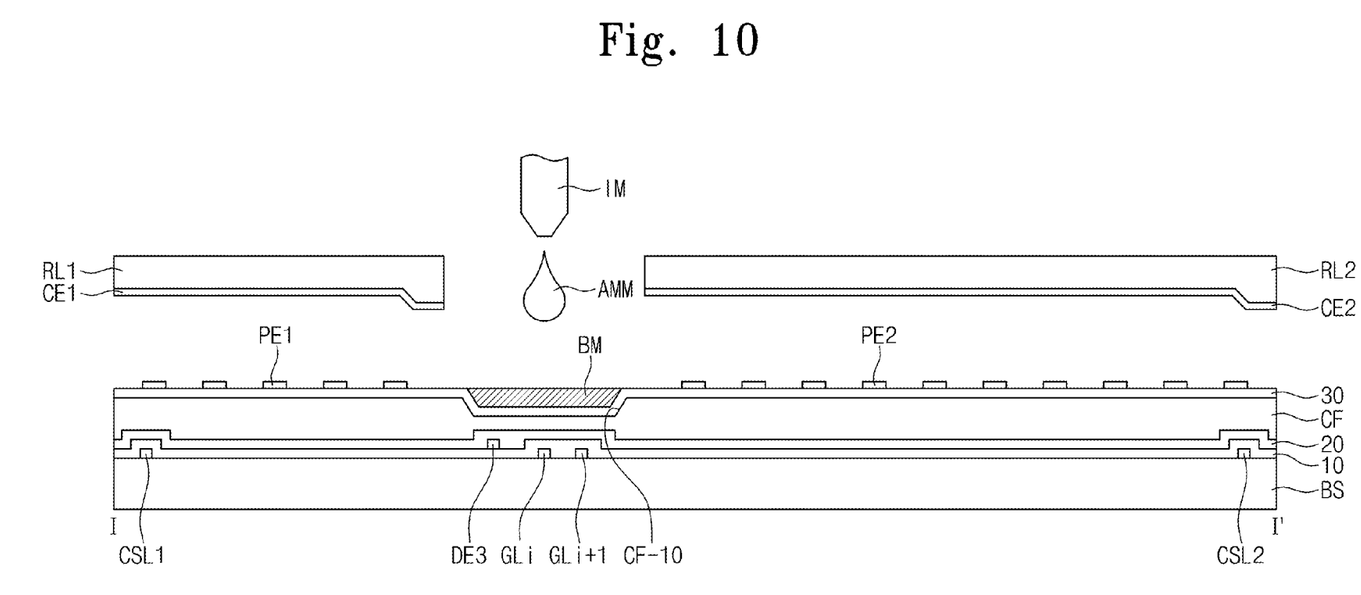
FIG. 10 is a cross-sectional view showing one process of processes used to form an alignment layer according to the present exemplary embodiment of the present disclosure.

FIG. 10 is a cross-sectional view showing one process from among the processes used to form the alignment layer according to the present exemplary embodiment of the present disclosure.

As shown in FIG. 10, a liquid alignment material AMM is provided to the circuit area CA disposed between the first display area DA1 and the second display area DA2. The liquid alignment material AMM may be provided using a pipette IM.

The liquid alignment material AMM provided in the circuit area CA enters into the first cavity CV1 and the second cavity CV2 by a capillary phenomenon. The liquid alignment material AMM is then dried to evaporate its solvent. Thus, the first alignment layer AML1 and the second alignment layer AML2 shown in FIG. 4 are formed.

Then, the liquid crystal layers LCL1 and LCL2 are formed (S110). A mixed solution in which the liquid crystal molecules are dissolved is provided near the first cavity CV1 and the second cavity CV2. The mixed solution is injected into the first cavity CV1 and the second cavity CV2 through the second inlet portions OP2 by the capillary phenomenon.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed. For example, elements and features from different embodiments may be mixed and matched as desired, to form further embodiments contemplated by the invention.

What is claimed is:

1. A display panel comprising:
    a base substrate including a pixel area and a peripheral area adjacent to the pixel area, the pixel area including display areas and circuit areas;
    a driving circuit disposed on each of the circuit areas;
    a color filter disposed on the base substrate and the pixel area to at least partially cover the driving circuit, the color filter having a lower surface facing the base substrate and an opposing upper surface, the upper surface including a depression positioned at least partially within each of the circuit areas, wherein each of the circuit areas is disposed between adjacent display areas;
    a black matrix disposed on the color filter and within the depression;
    a roof layer disposed on the color filter and defining a cavity at least partially positioned within the display area; and
    an alignment layer disposed inside the cavity;
    wherein the black matrix is deposited within the depression so as to substantially planarize the color filter.

2. The display panel of claim 1, wherein the cavity has a first inlet portion adjacent to the driving circuit and a second inlet portion facing the first inlet portion.

3. The display panel of claim 2, wherein the alignment layer covers one of the first inlet portion and the second inlet portion.

4. The display panel of claim 3, wherein the alignment layer covers the first inlet portion, and a thickness of the roof layer proximate to the first inlet portion is greater than a thickness of the roof layer proximate to the second inlet portion.

5. The display panel of claim 1, wherein:
    the display area comprises a first display area and a second display area spaced apart from each other with the circuit area positioned therebetween,
    the display panel further comprises a display element disposed on the color filter, the display element comprising a first display element positioned at least partially within the first display area and a second display element positioned at least partially within the second display area,
    the first display element comprises a first liquid crystal capacitor configured to have a voltage of a first level applied thereto, and
    the second display element comprises a second liquid crystal capacitor configured to have a voltage of a second level different from the first level applied thereto.

6. The display panel of claim 5, wherein the driving circuit comprises:
    a first thin film transistor for applying a data signal to the first liquid crystal capacitor;
    a second thin film transistor for applying the data signal to the second liquid crystal capacitor;
    a third thin film transistor configured to be turned on according to a timing different from a timing at which the second thin film transistor is turned on; and
    a coupling capacitor electrically connected to the second liquid crystal capacitor when the third thin film transistor is turned on, so as to reduce a charge of the second liquid crystal capacitor.

7. The display panel of claim 5, wherein each of the first liquid crystal capacitor and the second liquid crystal capacitor comprises a pixel electrode disposed on the color filter, a common electrode disposed under an inner surface of the roof layer defining the cavity, and a liquid crystal layer interposed between the pixel electrode and the common electrode.

8. The display panel of claim 1, wherein the black matrix at least partially overlaps both the circuit area and the peripheral area.

9. The display panel of claim 1, further comprising a display element disposed on the color filter, and an inorganic layer disposed between the color filter and the display element so as to protect the color filter.

10. The display panel of claim 1, wherein a maximum height of the black matrix disposed on the depression is smaller than a height of an inlet of the cavity.

\* \* \* \* \*